United States Patent
Kwon et al.

(10) Patent No.: US 7,689,215 B2
(45) Date of Patent: Mar. 30, 2010

(54) METHOD OF COMPRESSING CONTROL INFORMATION IN A WIRELESS COMMUNICATION SYSTEM

(75) Inventors: Tae-Soo Kwon, Daejeon (KR); Sung-Hyun Cho, Seoul (KR); Dong-Ho Cho, Seoul (KR); Sang-Boh Yun, Seongnam-si (KR); Won-Hyoung Park, Seoul (KR); Sik Choi, Daejeon (KR); Ho-Won Lee, Chungiu-si (KR); Ju-Yeop Kim, Anyang-si (KR); Ki-Ho Lee, Daejeon (KR)

(73) Assignees: Samsung Electronics Co., Ltd (KR); Korea Advanced Institute of Science & Technology (KR)

( * ) Notice: Subject to any disclaimer, the term of this patent is extended or adjusted under 35 U.S.C. 154(b) by 0 days.

(21) Appl. No.: 11/205,968

(22) Filed: Aug. 17, 2005

(65) Prior Publication Data

US 2006/0068823 A1     Mar. 30, 2006

(30) Foreign Application Priority Data

Aug. 17, 2004     (KR)    ....................... 10-2004-0064670

(51) Int. Cl.
    *H04W 4/00*     (2006.01)
(52) U.S. Cl. .................. 455/434; 455/435.1; 370/328
(58) Field of Classification Search ................ 455/434, 455/517, 524, 437, 436, 432.1, 432.2, 432.3, 455/433, 435.1; 370/331, 332, 310, 328, 370/338
See application file for complete search history.

(56) References Cited

U.S. PATENT DOCUMENTS

| | | | | |
|---|---|---|---|---|
| 5,758,291 A | * | 5/1998 | Grube et al. | 455/518 |
| 5,974,320 A | * | 10/1999 | Ward et al. | 455/437 |
| 6,173,181 B1 | * | 1/2001 | Losh | 455/434 |
| 6,216,004 B1 | * | 4/2001 | Tiedemann et al. | 455/442 |
| 6,819,923 B1 | * | 11/2004 | Friman | 455/424 |

(Continued)

FOREIGN PATENT DOCUMENTS

EP     1 353 521     10/2003

(Continued)

OTHER PUBLICATIONS

Hyunjeong Kang et al., "Scan Report Operation", IEEE 802.16 Broadband Wireless Acess Working Group, May 7, 2004.

(Continued)

*Primary Examiner*—Rafael Pérez-Gutiérrez
*Assistant Examiner*—Christopher M Brandt
(74) *Attorney, Agent, or Firm*—The Farrell Law Firm, LLP

(57) ABSTRACT

A method of compressing uplink control information in a wireless communication system where an MSS scans neighbor BSs upon request from a serving BS and transmits neighbor BS information to the serving BS. In the method, the serving BS broadcasts a neighbor advertisement message including the BS ID of at least one neighbor BS about which the serving BS wants to acquire information, and the BS ID of the at least one neighbor BS. The MSS then scans a channel from the at least one neighbor BS and transmits a scanning result along with a BS index of the at least one neighbor BS to the serving BS.

12 Claims, 4 Drawing Sheets

U.S. PATENT DOCUMENTS

| | | | |
|---|---|---|---|
| 6,968,189 B1* | 11/2005 | Mullins et al. | 455/434 |
| 7,031,288 B2* | 4/2006 | Ogier | 370/338 |
| 7,301,908 B2* | 11/2007 | Carroll | 370/236 |
| 2002/0001315 A1 | 1/2002 | Tran et al. | |
| 2002/0094817 A1* | 7/2002 | Rune et al. | 455/450 |
| 2003/0032430 A1* | 2/2003 | Lee | 455/436 |
| 2003/0045300 A1* | 3/2003 | New | 455/455 |
| 2003/0179731 A1* | 9/2003 | Noguchi et al. | 370/331 |
| 2003/0198179 A1* | 10/2003 | Koo et al. | 370/208 |
| 2003/0224790 A1* | 12/2003 | Choi | 455/435.3 |
| 2004/0018839 A1* | 1/2004 | Andric et al. | 455/433 |
| 2004/0043769 A1* | 3/2004 | Amerga et al. | 455/437 |
| 2004/0176094 A1 | 9/2004 | Kim et al. | |
| 2005/0054331 A1* | 3/2005 | Balachandran et al. | 455/414.1 |
| 2005/0130655 A1* | 6/2005 | Lundh et al. | 455/434 |
| 2005/0272425 A1* | 12/2005 | Amerga et al. | 455/436 |
| 2005/1026684 * | 12/2005 | Aerrabotu et al. | 455/436 |
| 2005/1027248 * | 12/2005 | Kim | 455/574 |
| 2006/0025158 A1* | 2/2006 | Leblanc et al. | 455/456.2 |
| 2006/0035639 A1* | 2/2006 | Etemad et al. | 455/436 |
| 2006/0223533 A1* | 10/2006 | Sakata | 455/436 |
| 2007/0123247 A1* | 5/2007 | Hunzinger | 455/422.1 |
| 2007/0149217 A1* | 6/2007 | Balachandran et al. | 455/456.1 |

FOREIGN PATENT DOCUMENTS

| | | |
|---|---|---|
| JP | 2002-543723 | 12/2002 |
| JP | 2005-533032 | 11/2005 |
| RU | 98121006 | 10/2000 |
| WO | WO 96/33588 | 10/1996 |
| WO | WO 97/40593 | 10/1997 |
| WO | WO 00/36853 | 6/2000 |
| WO | WO 00/67511 | 11/2000 |
| WO | WO 03/099838 | 12/2003 |
| WO | WO 2004/017578 | 2/2004 |

OTHER PUBLICATIONS

Kang et al., Scan Report Operation, IEEE 802.16 Broadband Wireless Access Working Group, May 17, 2004.

Barber et al., NBR-ADV Changes—HO Ad-Hoc Consensus, IEEE 802.16 Broadband Wireless Access Working Group, Jun. 25, 2004.

Zhang et al., Soft Handover and Fast BS Switching Procedure, IEEE 802.16 Broadband Wireless Access Working Group, Jul. 8, 2004.

* cited by examiner

US 7,689,215 B2

METHOD OF COMPRESSING CONTROL INFORMATION IN A WIRELESS COMMUNICATION SYSTEM

PRIORITY

This application claims priority under 35 U.S.C. § 119 to an application entitled "Method of Compressing Control Information in a Wireless Communication System" filed in the Korean Intellectual Property Office on Aug. 17, 2004 and assigned Ser. No. 2004-64670, the contents of which are incorporated herein by reference.

BACKGROUND OF THE INVENTION

1. Field of the Invention

The present invention relates generally to resource management in a wireless communication system, and in particular, to a method of reducing the overhead of an uplink control message to increase resource efficiency in a wireless communication system.

2. Description of the Related Art

Typically in a cellular wireless communication system, information about neighbor base stations (BSs) is collected to facilitate initial network connection and handover for a mobile subscriber station (MSS). To serve this purpose, a serving BS periodically transmits a channel request message to collect the channel information of neighbor BSs over a wireless network. An MSS, upon receipt of the channel request message, scans channels from the neighbor BSs and transmits channel information messages regarding the neighbor BSs to the serving BS.

To exchange information about the neighbor BSs, the serving BS and the MSS identify the neighbor BSs by global identifiers (IDs) specific to them. Therefore, control messages such as the channel request message and the channel information message include global IDs that identify the neighbor BSs.

In an Institute of Electrical and Electronic Engineers (IEEE) 802.16a system, for instance, a serving BS broadcasts information about neighbor BSs by a neighbor advertisement message to help an MSS to select the best cell. The neighbor advertisement message includes global IDs that identify the neighbor BSs. The MSS scans the channels of the neighbor BSs based on the neighbor advertisement message and transmits the channel scanning results to the serving BS by an uplink report message. Also, the MSS uses a global ID to notify the serving BS of a new BS to which the MSS will move during handover.

However, since the global IDs are rather long, transmission of all the global IDs in the uplink report message causes considerable overhead.

Moreover, the neighbor BSs are already known between the serving BS and the MSS in most cases because handover occurs within a neighbor BS set and the neighbor BS set is periodically broadcasted by the neighbor advertisement message. Accordingly, there is a need for reducing the overhead caused by transmitting such global IDs.

SUMMARY OF THE INVENTION

An object of the present invention is to substantially solve at least the above problems and/or disadvantages and to provide at least the advantages below. Accordingly, an object of the present invention is to provide a control information compressing method for reducing the overhead of uplink channels by compressing global IDs that identify neighbor BSs in an uplink report message.

Another object of the present invention is to provide a control information compressing method for increasing resource efficiency by reducing the overhead of uplink channels.

The above objects are achieved by providing a method of compressing uplink control information in a wireless communication system where an MSS scans neighbor BSs upon a request from a serving BS and transmits neighbor BS information to the serving BS.

In the method, the MSS compresses the BS global IDs of the neighbor BSs, and transmits neighbor BS information along with the compressed BS global IDs to the serving BS.

In compression step, the serving BS broadcasts a neighbor advertisement message including the BS ID of at least one neighbor BS about which the serving BS wants to acquire information and a BS index corresponding to the BS ID by the serving BS. The MSS then scans a channel from the at least one neighbor BS and transmits the BS index of the at least one neighbor BS together with a scanning result to the serving BS.

The serving BS keeps a mapping table in which the BS global IDs of neighbor BSs are mapped to the BS indexes of the neighbor BSs. The neighbor advertisement message includes a configuration change count indicating the time point when the neighbor advertisement message is transmitted, which indicates the frame number of the neighbor advertisement message. A response message for the neighbor advertisement message includes the configuration change count of the neighbor advertisement message.

It is preferred that the BS index is a loop index indicating the position of the BS global ID of the at least one neighbor BS, and the BS index is created by combining the loop index of the at least one neighbor BS and the configuration change count.

The BS index may also be created by combining the loop index of the at least one neighbor BS and the frame number of the neighbor advertisement message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

According to the IEEE 802.16 standard, an MSS uses 48-bit medium access control (MAC) addresses to identify neighbor BSs, when transmitting a scanning result to a serving BS by a MOB-SCAN-REPORT message. However, the present invention uses an 8-bit neighbor BS index instead of a 48-bit MAC address if all neighbor BSs in the MOB-SCAN-REPORT message are members of a neighbor BS list in a MOB-NBR-ADV message. In this case, an 8-bit neighbor BS index indicates the position of a corresponding neighbor BS in the neighbor BS list.

Figure 1:
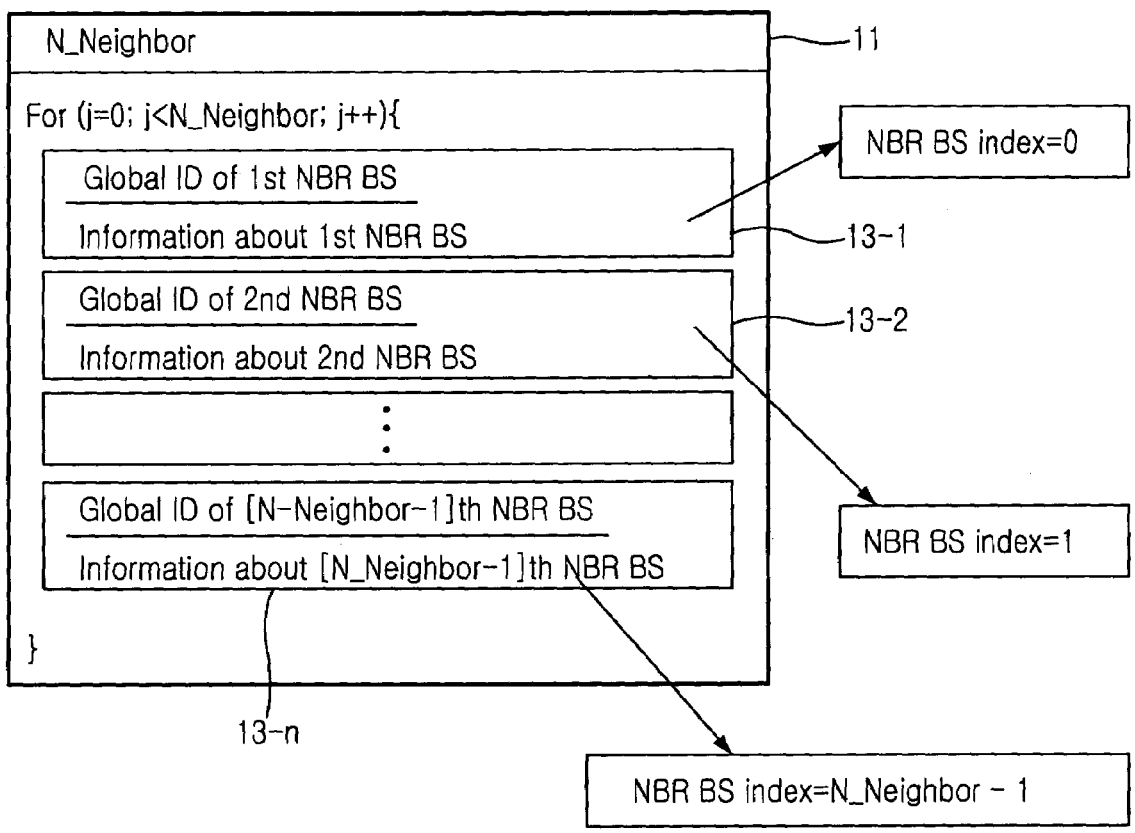
FIG. 1 is a conceptual view illustrating the basic structure of a neighbor advertisement message in relation to a control information compressing method according to a preferred embodiment of the present invention.

FIG. 1 is a conceptual view illustrating the basic structure of a neighbor advertisement message in relation to a control information compressing method according to a preferred embodiment of the present invention. The neighbor advertisement message includes an N_Neighbor field 11 indicating the number of neighbor BSs, Global IDs 13-1 to 13-*n* representing the unique MAC addresses of the neighbor BSs, and NBR BS indexes representing neighbor BS indexes mapped to the MAC addresses. To support the control information compressing method of the present invention, the serving BS keeps a mapping table in which the MAC addresses of the neighbor BSs are mapped to the neighbor BS indexes.

Figure 2:
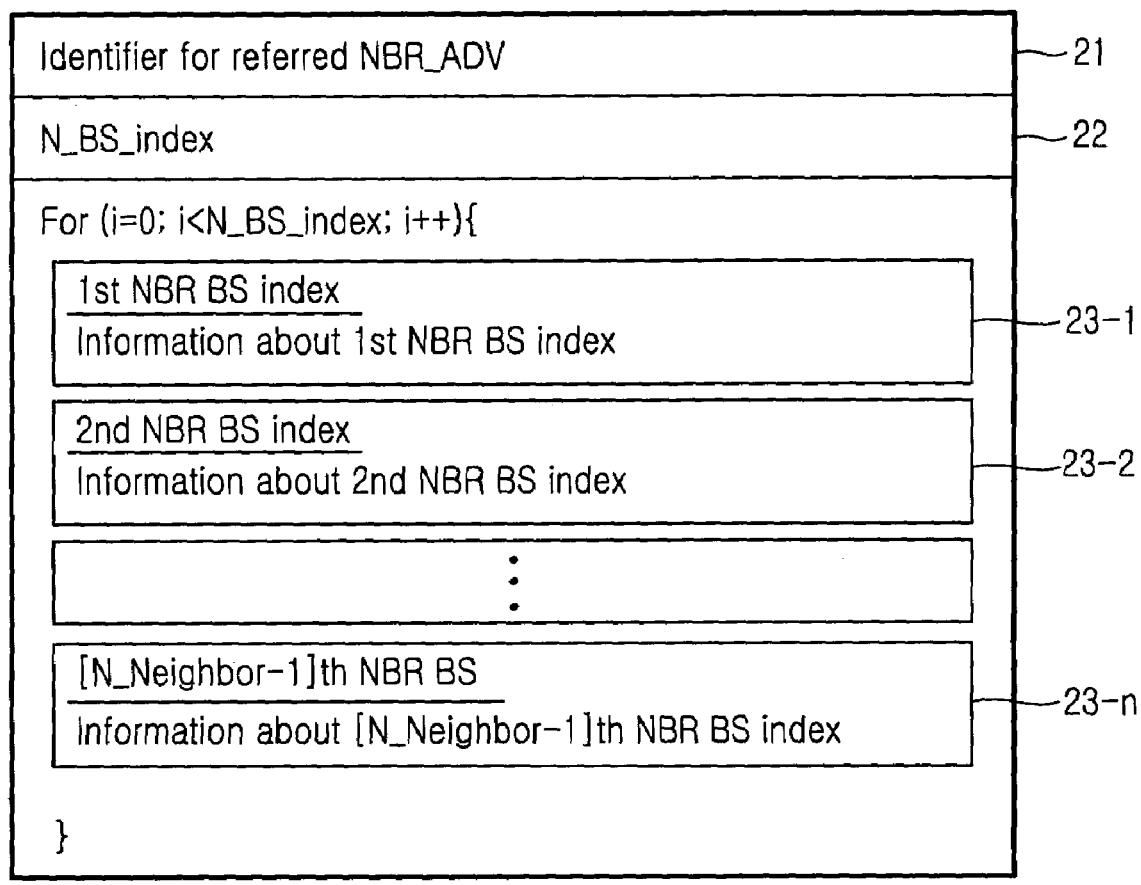
FIG. 2 is a conceptual view illustrating the structure of an uplink control message to which the control information compressing method is applied according to the preferred embodiment of the present invention.

FIG. 2 is a conceptual view illustrating the structure of an uplink control message to which the control information compressing method is applied according to the preferred embodiment of the present invention. Referring to FIG. 2, the uplink control message includes Identifier for referred NBR_ADV field 21 indicating the number of a frame that broadcasts the MOB-NBR-ADV message, NBR_BS_indexes 23-1 to 23-*n* as the IDs of the neighbor BSs in the MOB-NBR-ADV message, and N_BS_index field 22 indicating the number of the NBR_BS_indexes. Since the MOB-NBR-ADV message is periodically broadcasted by the serving BS, the MSS must set explicitly the Identifier for referred NBR_ADV field 21 regarding the MOB-NBR-ADV message in the uplink control message.

Figure 3:
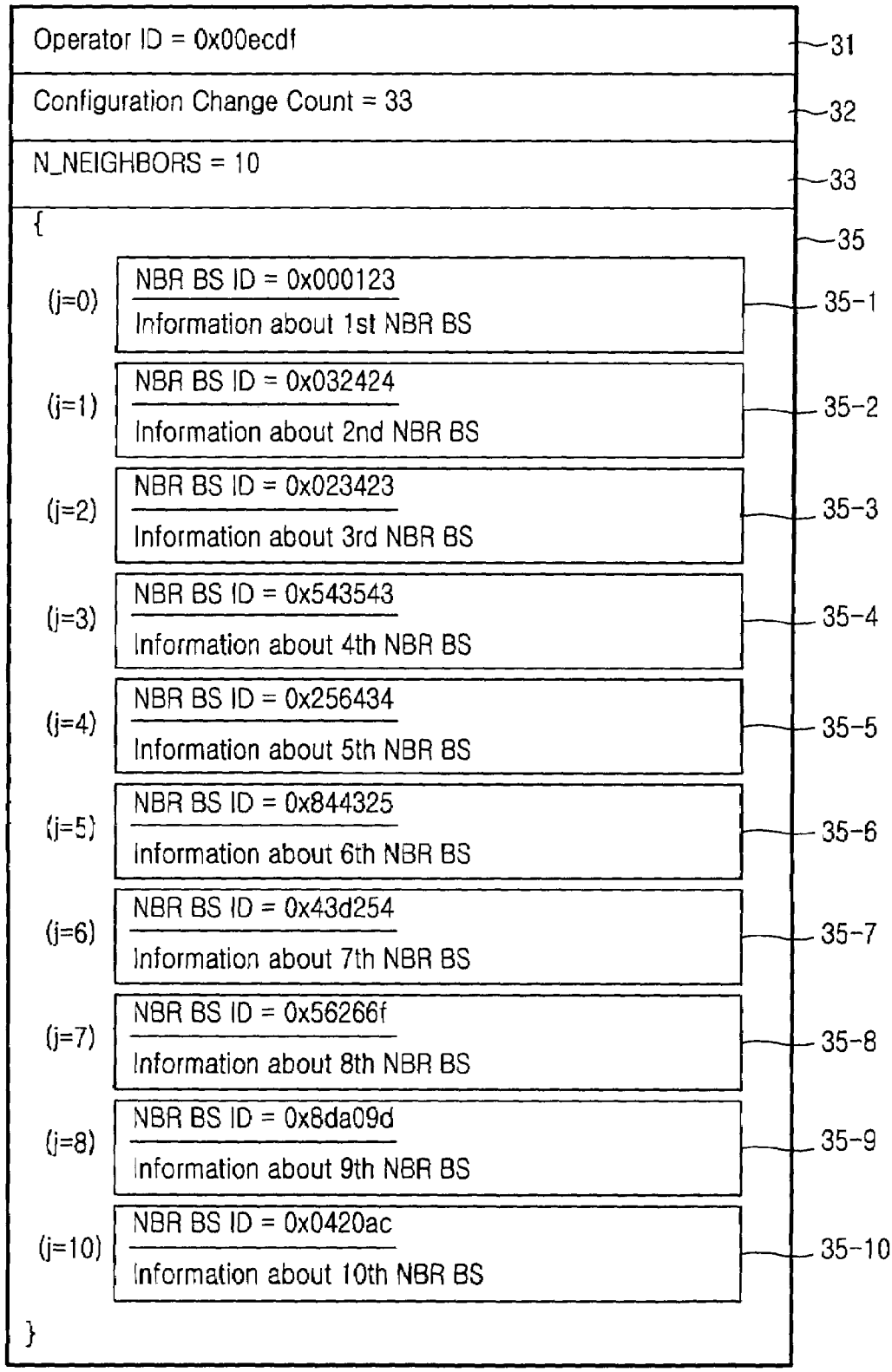
FIG. 3 illustrates a MOB-NBR-ADV message to be referred to for describing the control information compressing method according to the preferred embodiment of the present invention.

FIG. 3 illustrates the structure of the MOB-NBR-ADV message to be referred to for describing the control information compressing method according to the preferred embodiment of the present invention.

Referring to FIG. 3, the MOB-NBR-ADV message broadcasted by the serving BS includes 24-bit Operator ID field 31, Configuration Change Count field 32 indicating the instance of the current MOB-NBR-ADV message, N_NEIGHBORS field 33 indicating the number of neighbor BSs included in the MOB-NBR-ADV message, and a BS list 35 listing the actual IDs of the neighbor BSs.

In the illustrated case, the Operator ID is 0x00ecdf, the Configuration Change Count is 33, and the N_NEIGHBORS is 10.

In the BS list, the IDs of first through tenth neighbor BSs 35-1 to 35-10 are set as NBR_BS_ID=0x000123, NBR_BS_ID=0x032424, NBR_BS_ID=0x023423, NBR_BS_ID=0x543543, NBR_BS_ID=0x256434, NBR_BS_ID=0x844325, NBR_BS_ID=0x43d254, NBR_BS_ID=0x56266f, NBR_BS_ID=0x8da09d, and NBR_BS_ID=0x0420ac, in this order.

Each one of these BS IDs 35-1 to 35-10 has 24 bits. A 24-bit ID and the 24-bit Operator ID field 31 form a 48-bit global ID, that is, a MAC ID.

The serving BS transmits the indexes of the neighbor BSs indicating their positions in the BS list 35 of the MOB-NBR-ADV message, that is, loop indexes "j", together with the BS IDs, and stores a mapping table in which the BS IDs of the BS list are mapped to the neighbor BS indexes. Therefore, j=0: NBR_BS_ID=0x000123 (35-1)
j=1: NBR_BS_ID=0x032424 (35-2)
j=2: NBR_BS_ID=0x023423 (35-3)
j=3: NBR_BS_ID=0x543543 (35-4)
j=4: NBR_BS_ID=0x256434 (35-5)
j=5: NBR_BS_ID=0x844325 (35-6)
j=6: NBR_BS_ID=0x43d254 (35-7)
j=7: NBR_BS_ID=0x56266f (35-8)
j=8: NBR_BS_ID=0x8da09d (35-9)
j=9: NBR_BS_ID=0x0420ac (35-10)

Upon receipt of the MOB-NBR-ADV message from the serving BS, the MSS stores the same mapping table, scans the channels from the neighbor BSs, and reports the scanning result to the serving BS.

Figure 4:
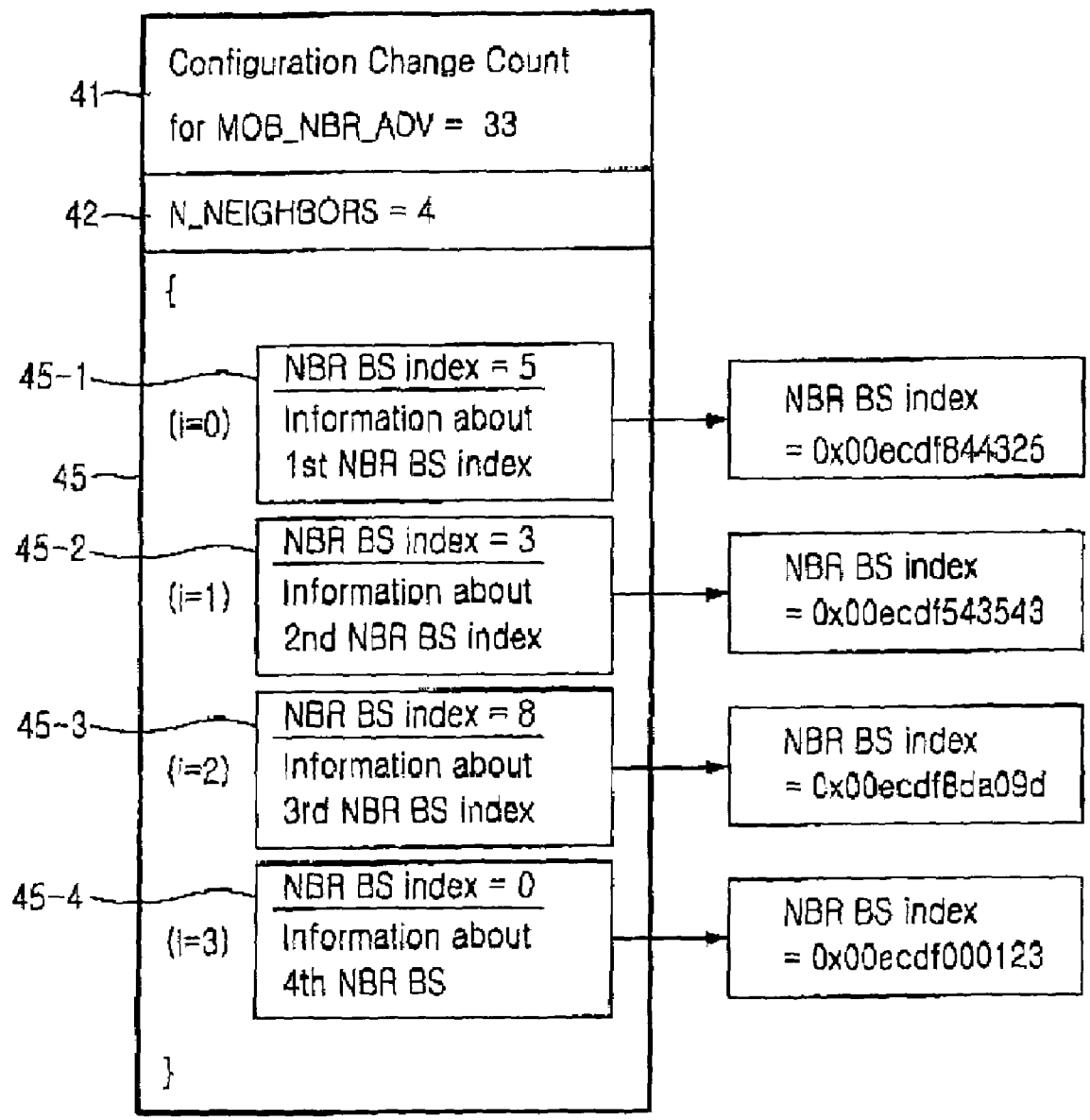
FIG. 4 illustrates a MOB-SCAN-REPORT message that an MSS transmits to a BS as a response for the MOB-NBR-ADV message illustrated in FIG. 3.

FIG. 4 illustrates the MOB-SCAN-REPORT message that the MSS transmits to the serving BS as a response for the MOB-NBR-ADV message illustrated in FIG. 3. The MOB-NBR-ADV message is periodically broadcasted and the neighbor BSs listed in the BS list of the MOB-NBR-ADV message may be changed due to a change of the network topology or communication environment. Hence, Configuration Change Count must be included in the MOB-SCAN-REPORT message in order to use the neighbor BS indexes rather than the MAC addresses of the neighbor BSs.

Referring to FIG. 4, the MOB-SCAN-REPORT message includes Configuration Change Count field 41 indicating the MOB-NBR-ADV message that the MSS refers to, N_NEIGHBORS field 42 indicating the number of the neighbor BSs set in the MOB-NBR-ADV message, and a BS index list 45 listing neighbor BS indexes corresponding to the global IDs of the scanned neighbor BS.

In the illustrated case, the Configuration Change Count is 33, equal to that in the MOB-NBR-ADV message and the N_NEIGHBORS is 4.

The BS index list 45 has the indexes of the scanned neighbor BSs 45-1 to 45-4 corresponding to loop indexes "j" set in the MOB-NBR-ADV message.

These neighbor BS indexes are set as NBR_BS_INDEX=5, NBR_BS_INDEX=3, NBR_BS_INDEX=8, and NBR_BS_INDEX=0, in this order.

Upon receipt of the MOB-SCAN-REPORT message from the MSS, the serving BS selects a corresponding mapping table based on the Configuration Change Count=33 and determines the neighbor BSs based on the BS indexes set in the MOB-SCAN-REPORT message.

NBR_BS_INDEX=5, NBR_BS_INDEX=3, NBR_BS_INDEX=8, and NBR_BS_INDEX=0 set in the MOB-SCAN-REPORT message are mapped to the following actual BS global IDs.

NBR_BS_INDEX=5: NBR_BS_ID=0x00ecdf844325
NBR_BS_INDEX=3: NBR_BS_ID=0x00ecdf543543
NBR_BS_INDEX=8: NBR_BS_ID=0x00ecdf8da09d
NBR_BS_INDEX=0: NBR_BS_ID=0x00ecdf000123

In this way, replacing NBR_BS_ID with NBR_BS_INDEX in the uplink control message leads to a bit reduction, which is calculated by Equation 1:

$$SB = (NBR\_BS\_ID\ length - NBR\_BS\_INDEX\ length) \times N\_BS\_INDEX - Configuration\ Change\ Count \quad (1)$$

where N_BS_INDEX is equivalent to N_NEIGHBORS in the MOB-SCAN-REPORT message.

In the above example illustrated in FIGS. 3 and 4, the number of saved bits is (48−8)×10−8=392 bits.

Table 1 below lists the number of saved bits with respect to N_BS_INDEX when the uplink control message compressing method of the present invention is used.

TABLE 1

| | N_BS_INDEX | | | | | |
|---|---|---|---|---|---|---|
| | 1 | 2 | 3 | 4 | 5 | 6 |
| Number of saved bits | 32 | 72 | 112 | 152 | 192 | 232 |

While the uplink control message compressing method using NBR_BS_INDEX is applied to the MOB-SCAN-RE- PORT message according to the preferred embodiment of the present invention, to which the present invention is not limited, the same is applicable to any other control message like a MOB-MSSHO-REQ message used for MSS-initiated handover.

As described above, the uplink control information compressing method of the present invention compresses long BS addresses when exchanging information about neighbor BSs between a BS and an MSS. Thus, radio resources are saved. This uplink control information compression increases resource efficiency and thus system capacity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting scanning information of neighbor base stations (BSs) by a mobile subscriber station (MSS) in a wireless communication system, the method comprising the steps of:

receiving a neighbor advertisement message including first identifiers of the neighbor BSs and a configuration change count (CCC) from a serving BS; and transmitting to the serving BS a scan report message including scanning information of at least one scanned neighbor BS which is listed in the neighbor advertisement message and a second identifier of each of the scanned neighbor BSs, wherein the second identifier indicates an index corresponding to a position of one of the first identifiers in the neighbor advertisement message and is shorter than the first identifiers in a bit unit, and the scan report message includes the CCC which indicates whether information of the neighbor BSs is changed in the neighbor advertisement message and the scan report message, and wherein the CCC relates the scan report message with the neighbor advertisement message.

2. The method of claim 1, wherein the first identifiers represent medium access control (MAC) addresses of the neighbor BSs.

3. The method of claim 1, further comprising, keeping a mapping table in which a BS identifier corresponding to each of the neighbor BSs is mapped to a position of the corresponding BS identifier from among the first identifiers in the neighbor advertisement message.

4. The method of claim 1, further comprising:

scanning at least one neighbor BS which is listed in the neighbor advertisement message;

generating the scanning information of the scanned neighbor BS; and determining the second identifier according to a position of the first identifier for each of the scanned neighbor BS in the neighbor advertisement message.

5. A method for receiving scanning information of neighbor base stations (BSs) by a serving BS in a wireless communication system, the method comprising the steps of:

transmitting a neighbor advertisement message including first identifiers of the neighbor BSs and a configuration change count (CCC) to a mobile subscriber station (MSS);

receiving from the MSS a scan report message including scanning information of at least one scanned neighbor BS which is listed in the neighbor advertisement message and a second identifier of each of the scanned neighbor BSs, wherein the second identifier indicates an index corresponding to a position of one of the first identifiers in the neighbor advertisement message and is shorter than the first identifiers in bit unit, and the scan report message includes the CCC which indicates whether information of the neighbor BSs is changed in the neighbor advertisement message and the scan report message, and wherein the CCC relates the scan report message with the neighbor advertisement message.

6. The method of claim 5, wherein the first identifiers represent medium access control (MAC) addresses of the neighbor BSs.

7. The method of claim 5, further comprising keeping a mapping table in which a BS identifier corresponding to each of the neighbor BSs is mapped to a position of the corresponding BS identifier from among the first identifiers in the neighbor advertisement message.

8. The method of claim 5, wherein the CCC indicates frame numbers of the neighbor advertisement message and the scan report message respectively.

9. A mobile subscriber station (MSS) apparatus for transmitting scanning information of neighbor base stations (BSs) in a wireless communication system, the apparatus comprising:

a receiver for receiving a neighbor advertisement message including first identifiers of the neighbor BSs and a configuration change count (CCC) from a serving BS; and a transmitter for transmitting to the serving BS a scan report message including scanning information of at least one scanned neighbor BS which is listed in the neighbor advertisement message and a second identifier of each of the scanned neighbor BSs, wherein the second identifier indicates an index corresponding to a position of one of the first identifiers in the neighbor advertisement message and is shorter than the first identifiers in bit unit, and the scan report message includes the CCC which indicates whether information of the neighbor BSs is changed in the neighbor advertisement message and the scan report message, and wherein the CCC relates the scan report message with the neighbor advertisement message.

10. The apparatus of claim 9, further comprising a generator for scanning at least one neighbor BS which is listed in the neighbor advertisement message, generating the scanning information of the scanned neighbor BS, and determining the second identifier according to a position of the first identifier for each of the scanned neighbor BS in the neighbor advertisement message.

11. The apparatus of claim 9, wherein the first identifiers represent medium access control (MAC) addresses of the neighbor BSs.

12. The apparatfus of claim 9, further comprising a keeper for keeping a mapping table in which a BS identifier corresponding to each of the neighbor BSs is mapped to a position of the corresponding BS identifier from among the first identifiers in the neighbor advertisement message.

* * * * *